United States Patent [19]
Plott

[11] Patent Number: 5,488,307
[45] Date of Patent: Jan. 30, 1996

[54] SENSOR INTERFACE METHOD AND APPARATUS

[75] Inventor: Robert J. Plott, Mentor, Ohio

[73] Assignee: Namco Controls Corporation, Highland Hts., Ohio

[21] Appl. No.: 172,571

[22] Filed: Dec. 22, 1993

[51] Int. Cl.⁶ .................................................. G01R 31/02
[52] U.S. Cl. ........................ 324/555; 324/66; 340/507
[58] Field of Search ........................... 324/66, 585, 537, 324/522, 764; 340/508, 507, 511, 635, 653, 525

[56] References Cited

U.S. PATENT DOCUMENTS

| | | |
|---|---|---|
| 3,569,731 | 3/1971 | Gavira . |
| 3,604,950 | 9/1971 | Anderson et al. . |
| 3,728,616 | 4/1973 | Cheek et al. ............................. 324/66 |
| 3,942,044 | 3/1976 | Armstrong . |
| 4,130,794 | 12/1978 | Cox ......................................... 324/66 |
| 4,386,333 | 5/1983 | Dillan . |
| 4,414,539 | 11/1983 | Armer ..................................... 340/507 |
| 4,422,066 | 12/1983 | Belcourt et al. . |
| 4,468,612 | 8/1994 | Starr ......................................... 324/66 |
| 4,698,585 | 10/1987 | Herman et al. ........................... 324/66 |
| 4,740,966 | 4/1988 | Goad . |
| 4,772,845 | 9/1988 | Scott ....................................... 324/66 |
| 4,797,582 | 1/1989 | Nguyen et al. . |
| 4,972,107 | 11/1990 | Draxelmayr . |
| 5,030,939 | 7/1991 | Lovick . |
| 5,095,277 | 3/1992 | Cerda ..................................... 324/66 |
| 5,132,968 | 7/1992 | Cephus . |
| 5,203,004 | 4/1993 | Bunton et al. . |
| 5,296,850 | 3/1994 | King ....................................... 324/66 |

Primary Examiner—Maura K. Regan
Attorney, Agent, or Firm—Watts, Hoffmann, Fisher & Heinke Co.

[57] ABSTRACT

A sensor interface for determining whether a three-wire or a two-wire sensor is coupled to the interface. In the case of a three-wire interface, the interface determines that the sensor is powered by a power supply through a selected contact in electrical communication with the sensor. For both two- and three-wire sensors the interface generates an output corresponding to a status of the attached sensor.

7 Claims, 3 Drawing Sheets

SENSOR INTERFACE METHOD AND APPARATUS

TECHNICAL FIELD

The present invention concerns an interface that monitors and evaluates sensor signals and enables those signals to be evaluated regardless of the configuration of the sensor.

BACKGROUND ART

Many manufacturing processes are monitored using sensors that detect a physical phenomena such as movement or position of an actuator at a sensing site. In one form a detection sensor is connected to two-wires for carrying either alternating current or direct current signals between the sensor and a monitoring circuit that determines a status (open or closed) of a switch within the sensor.

Other sensors require a three-wire input to the sensor. One of the three-wires provides a sensor power input for energizing circuitry at the sensor site. The so-called three-wire sensors are divided into two categories. If the sensor circuitry sinks current, it draws current into the sensor from the monitoring circuit to a ground potential coupled to the sensor by a ground connection. If the sensor circuitry is a source of current, energy supplied by the power input to the sensor is output in the form of a current signal from the sensor to the monitoring circuit.

The choice between a two-wire and a three-wire sensor is based at least in part upon cost, current or power consumption and response time. Generally, suitable two-wire and three-wire sensors can be used in most applications.

Namco Controls Corporation, assignee of the present invention, markets monitoring systems for determining the status of sensing circuits. Heretofore, special interfacing was required depending upon the type of sensor the circuit was monitoring. The present invention concerns a universal input or interface for mating with a sensor that automatically provides signals corresponding to the state of the sensor regardless of the type of sensor.

DISCLOSURE OF THE INVENTION

A sensor interface circuit constructed in accordance with the present invention mates with a cable for conducting signals between a number of different possible sensor configurations and the sensor interface circuit. A connector used with the interface has three conductive contacts for mating with either a two-wire or three-wire cable connected to a sensor. A current sensor has an input coupled to one of the said three conductive contacts through which power may be applied to an attached sensor. An output from the current sensor corresponds to current flow through the contact. A monitor coupled to the output from the current sensor determines if power is supplied to a sensor through that contact.

By monitoring the current flowing through one contact of the connector the monitoring circuit can distinguish between a two-wire and a three-wire sensor. If power is applied to the sensor through that contact in order to make the sensor function, a three-wire sensor is connected to the interface. The monitoring circuit responds to sensor signals that indicate a state of the sensor. If no current flows through the contact, then a two-wire system is in use and the monitoring circuit determines the state or status of a two-wire sensor. If current is flowing, a three-wire sensor is in use and the monitor determines its status. The monitoring circuit can also detect a malfunction caused by a short or open circuit and provide diagnostic information concerning the type of fault.

BEST MODE FOR PRACTICING THE INVENTION

Figure 1:
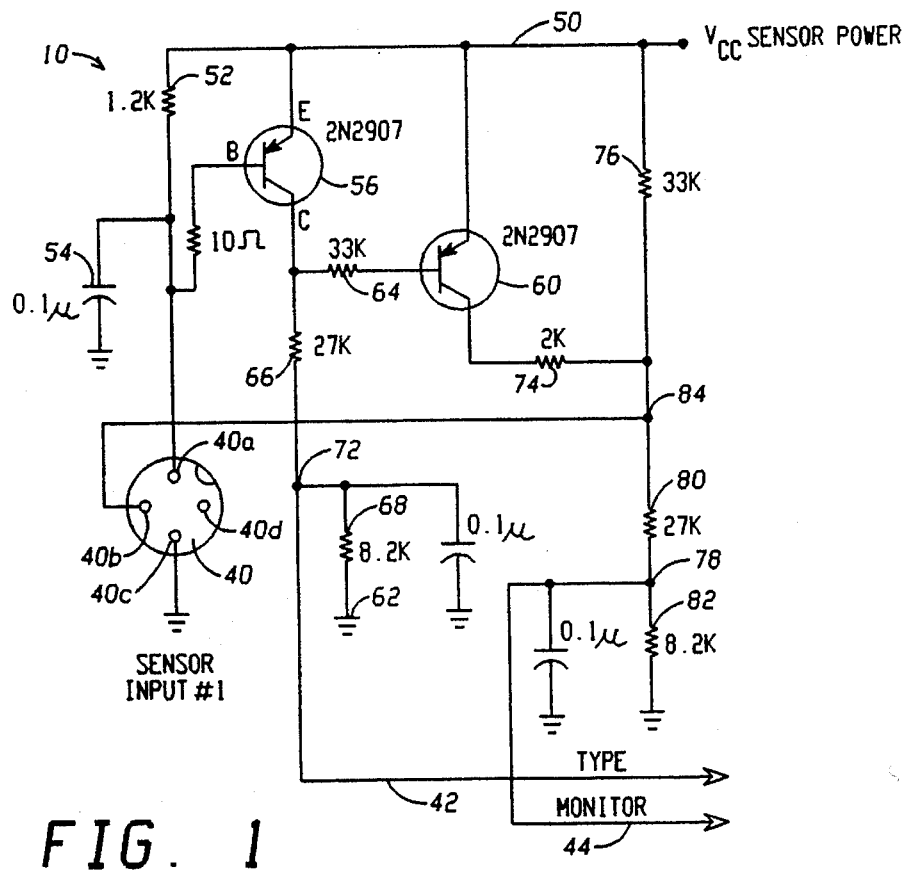
FIG. 1 is an interface circuit shown connected to a connector that mates with a cable coupled to a sensor at an opposite end of the cable.

Turning to the drawings, FIG. 1 illustrates an interface circuit 10 that allows signal outputs from different types of sensors to be evaluated. This evaluation is done without user intervention and does not require the user to make any switch selections or adjustments. One typical use of the invention is for use with sensors that monitor movement or position of an actuator for performing a manufacturing step.

Figure 2A:
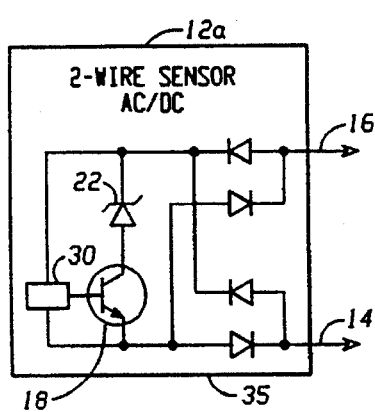
FIGS. 2A, 2B, and 2C are alternate sensor configurations that can be connected to the FIG. 1 interface circuit.
Figure 2B:
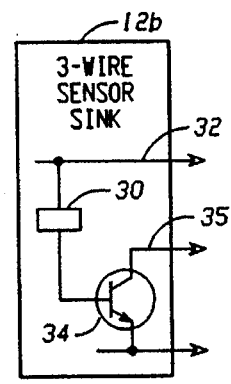
Figure 2C:
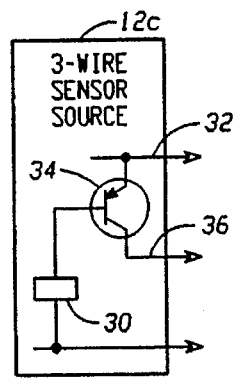

Three different sensors 12a, 12b, 12c are shown in FIGS. 2A, 2B, and 2C. In the FIG. 2A application the sensor 12a requires only two connections, a first connection 16 is a power/output connection and the second connection 14 is grounded. A full wave rectifier 35 allows the sensor 12a to operate on alternating current or either polarity direct current. An auxiliary circuit 30 draws a minimal current (typically 1.5 mA) from the power/output connection 16. The auxiliary circuit 30 controls the operating state of a transistor 18 or other control device within the sensor and the conductive state of this device provides an indication of the status of the sensor. When the transistor 18 is not conducting (OFF sensor state) only the auxiliary circuit 30 draws current from the connection 16. When the transistor 18 conducts (ON sensor state) a zener diode 22 is coupled in series with the transistor 18 across the connections 16,14. The zener diode 22 sets a defined ON state voltage drop and maintains the voltage necessary to operate the auxiliary circuit 30.

The sensors 12b, 12c shown in FIGS. 2B and 2C are three-wire sensors in which an auxiliary circuit 30 is powered by a power input 32 to the sensors. The auxiliary circuit 30 controls the operating state of a transistor 34 or other control device within the sensor and the conductive state of the transistor provides an indication of the status of the sensor. The sensor 12b of FIG. 2B is a current sink since current from the interface 10 enters a collector connection 35 when the transistor 34 conducts. The sensor 12c of FIG. 2C is a current source since current is transmitted back through a collector connection 36 to the interface 10 when the transistor 34 conducts. Examples of prior art two-wire and three-wire sensors are part numbers EE530-50400 (2 wire) and EE510-50440 commercially available from Namco Controls, assignee of the present invention.

Turning to FIG. 1 the interface 10 is shown connected to a four pin eurostyle connector 40 that has four contacts or pin connectors 40a,40b,40c,40d. Three pin connectors 40a, 40b and 40c are electrically connected to the circuit 10. The circuit 10 provides two outputs 42,44 which determine which type of sensor is connected to the interface 10 and the status of that sensor. Commercial sources for these connectors 40 are Brad Harrison (P.N. 80206), Lümberg (P.N. RSF 3/0.5 m) and others.

Two-Wire Configuration

If the interface 10 is coupled to a two-wire sensor, the pin 40a of the connector 40 draws no current from a power input 50 to the interface 10. The connections 16,14 to the sensor 12a are coupled to the pins 40b,40c of the connector 40. Since the pin 40a draws no current, there is no voltage drop across a 1.2 Kilohm resistor 52 that couples the power input 50 to the pin 40a. With no current in the resistor 52 the voltage on a capacitor 54 is at the power supply voltage (VCC).

The voltage on the capacitor 54 will bias a PNP transistor 56 off and a second PNP transistor 60 turns on. The conducting transistor 60 provides a voltage divider across the power input 50 and a ground connection 62. This voltage divider is made up of three resistors 64,66,68. In accordance with a preferred embodiment of the invention the power input 50 is the output of a voltage regulator 70 (FIG. 3) and is maintained at twenty volts. When the transistor 60 conducts, a voltage at a junction 72 that forms one of the two outputs 42 from the interface is approximately 2.4 volts.

Three-Wire Configuration

When power is applied to a three-wire sensor through the connector 40, current flows through the pin 40a and a voltage drop develops across the resistor 52. When this voltage drop exceeds 0.7 volts the transistor 56 turns on and the transistor 60 turns off. When this occurs, the voltage at the output junction 72 is formed by the voltage divider action of the resistors 66,68 connected across the power input 50 by the transistor 56. This produces a voltage of 4.6 volts at the output 42. The difference in voltage at the output 42 provides a means of distinguishing between a three-wire and a two-wire sensor.

Sensor Status

The status of the pin 40b is monitored by the interface 10 to determine the status of the sensor, regardless of whether it is a two-wire or a three-wire sensor. For a two-wire sensor, the transistor 60 conducts. This places a 2 Kilohm resistor 74 in parallel with a resistor 76 between the power input 50 and the pin 40b.

There are four possible states for the two-wire sensor of FIG. 2A and the output 44 has a different voltage level for each of these four states. A short across the sensor 12a is different than an ON sensor state due to the presence of the zener diode 22 within the sensor. Also an open circuit condition can be distinguished from an OFF sensor condition due to the current drawn by the sensor.

If the switch 18 (FIG. 2A) is open, the sensor is OFF and the voltage at a junction 78 between two resistors 80,82 is approximately 3.8 volts. In the event of an open circuit, this voltage rises to 4.4 volts. When the switch 18 closes, the zener diode 22 conducts and the voltage at the junction 78 falls to 2.3 volts. A dead short across the sensor connections 14,16 will pull the junction 78 to ground.

A three-wire sensor status is also monitored at the pin 40b. Recall that when a three-wire sensor is connected, the transistor 56 is biased into conduction and the transistor 60 turns off. This will cause a junction 84 to float at about 10 volts unless the transistor 34 inside the sensor (12b or 12c) conducts. When the transistor 34 is not conducting, the junction 78 that forms the output 44 has a voltage of 2.5 volts. When the sensor sinks current (FIG. 2B), the transistor 34 will pull the pin 40b to ground and the output 44 from the junction 78 will be pulled low. If the sensor sources current (FIG. 2C), the transistor 34 will bring the junction 84 close to 20 volts and the junction 78 provides a signal at the output 44 of 5 volts.

Figure 5:
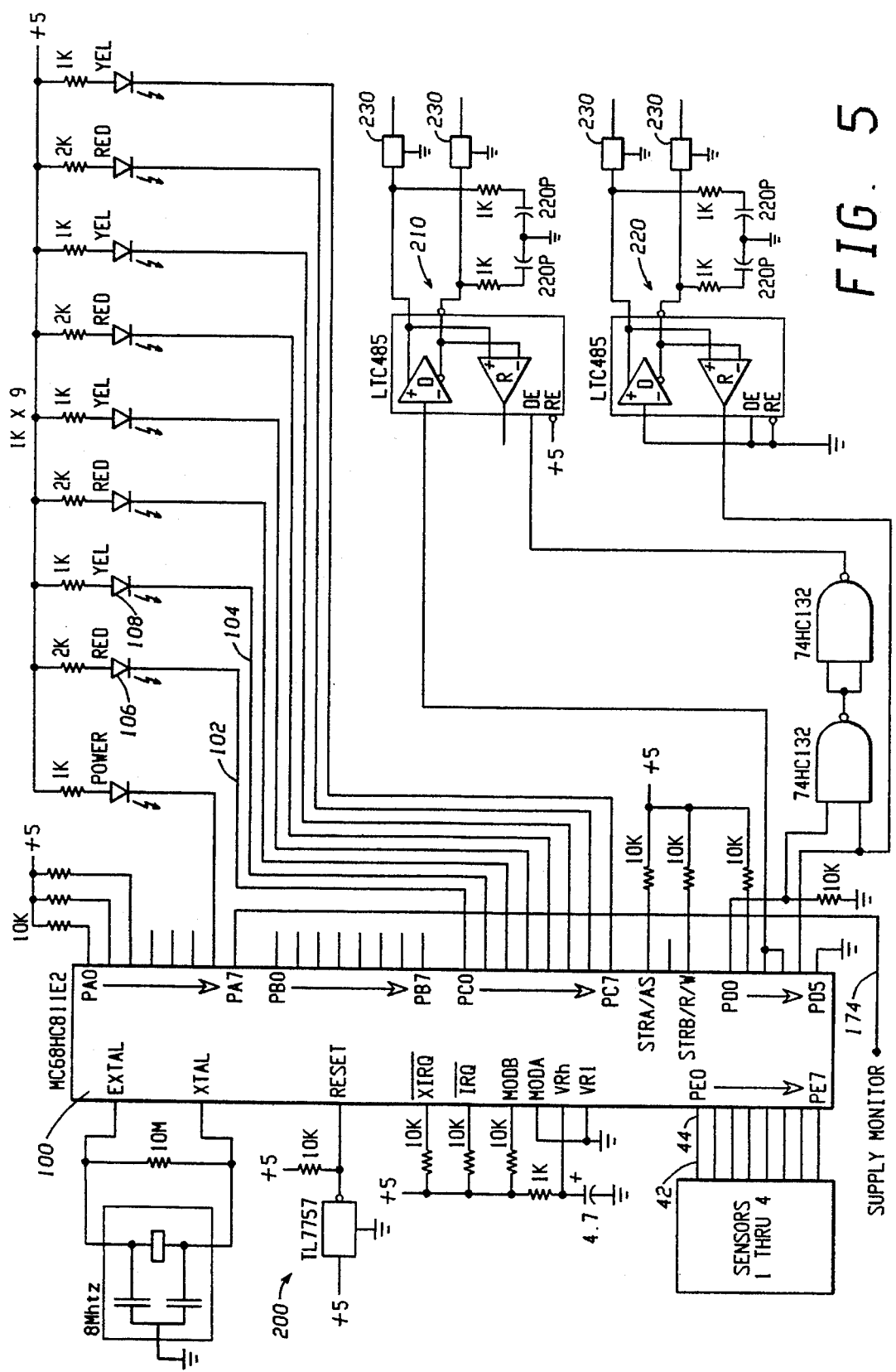
FIG. 5 is an alternate schematic showing a programmable controller version of a circuit for monitoring signals from the interface circuit of FIG. 1.

In accordance with the preferred embodiment of the present invention, the two output signals 42,44 are monitored by a microprocessor controller 100 depicted in FIG. 5. The microprocessor 100 is configured to accept the input signals generated by four different sensors so the two inputs 42,44 constitute two inputs on I/O port PE0–PE7 of the microprocessor 100. By selectively activating two output pins 102,104 on I/O port PC0–PC7, two diagnostic light-emitting diodes 106,108 are activated in response to the inputs 42,44. Since each of the ports PE0–PE7 and PC0–PC7 are 8-bit ports, a total of four sensors are monitored by the microprocessor 100. Additional light-emitting diodes connected to the port PC0–PC7 provide information regarding three additional sensors.

The preferred microprocessor 100 is an 8-bit microprocessor operating at 8 megahertz and including its own internal RAM for storing temporary data and programmable E$^2$ROM for storing an operating system. The operating system program monitors sensor inputs and provides diagnostic outputs as well as communication signals for communicating sensor information with a remotely located controller.

The microprocessor operating system includes a control loop which determines the status of each of four sensors and generates output signals for indicating the status of those sensors. The logic of the control algorithm is depicted in FIG. 4 which defines a hard-wired equivalent circuit 110 to the operating system executing within the microprocessor 100.

Figure 4:
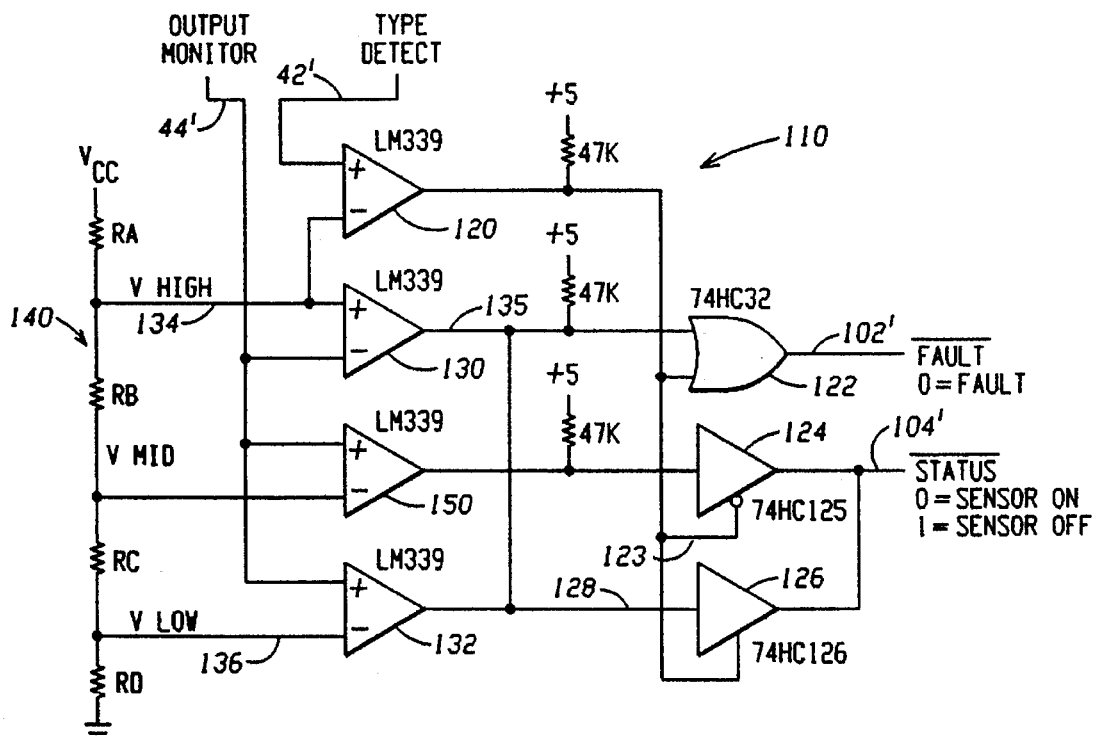
FIG. 4 is a schematic of logic circuitry for use in evaluating the outputs from the FIG. 1 interface circuit.

Turning to FIG. 4, the circuit 110 includes two inputs 42',44' which in turn control the status of two outputs 102',104'. These outputs correspond to the control outputs 102,104 from microprocessor I/O port PC0–PC7. The input 42' corresponds to the signal generated by the interface 10 indicating the type of sensor (either two-wire or three-wire) coupled to the connector 40.

Recall that a high signal at the input 42' corresponds with the situation when the transistor 60 (FIG. 1) is non-conductive, i.e., a three-wire sensor. With the signal 42' high, an output from a comparator 120 of the logic circuit 110 is also high, assuring that one input to an ORgate 122 is high. The high output from the comparator 120 is applied to an enable line 123 of a tri-state buffer 124, assuring that this buffer 124 is disabled. A second buffer 126 is enabled under these conditions, assuring that an output from this buffer 126 dictates the state of a status output 104'. The buffer 126 has an input 128 coupled to the output from two comparators 130,132 discussed below.

For a three-wire sensor (the input 42' will be high), the output monitor signal 44 for an activated sensor (i.e., the transistor 34 conducts) goes either high or low. For a non-activated sensor, this output signal 44 will be approximately 2.5 volts.

The comparator 130 has a reference input 134 which is held at a reference value of approximately 4.0 volts by a voltage divider 140. This value is greater than the 2.5-volt signal at the input 44' so that with a three-wire sensor in an OFF condition, an output 135 from the comparator 130 will be high. This high signal will be transmitted through the buffer 126 to the output 104' from the logic circuit 110. A reference input 136 to the comparator 132 is also held at 1.0 volts by the voltage divider 140. This assures that the 2.5-volt signal at the input 44' is greater than the reference input to the comparator 132, thus assuring an output from this comparator 132 is also high.

If the signal at the output monitor 44 goes either high or low corresponding to an activated sensor that either sinks or sources current, an appropriate one of the comparator amplifiers 130,132 will change state providing a low signal at the output 104'. Thus, for example, for a three-wire sensor that sinks current, the signal 44' will be pulled low causing the comparator amplifier 132 to produce a low output signal that is transferred to the output 104'.

When a two-wire sensor is coupled to the connector 40, the input 42' is pulled below the reference input 134 to the comparator 120. This produces a low output signal from the comparator 120 causing the buffer 126 to be disabled and enabling the buffer 124. When this occurs, a comparator 150, whose output is connected to the buffer 124, provides an output for determining the status of the two-wire sensor.

A reference input 152 to the comparator is held at a voltage of 3.0 volts by the voltage divider 140. The comparator 150 will determine the output state 104' for a two-wire sensor. If the switch 18 (FIG. 2A) is open, the monitor input 44' is greater than the input 152 and the output 104' is low. Once the switch 18 closes, the input 44' is pulled low (but not grounded).

Table I (below) summarizes the different inputs and outputs based upon monitored sensor conditions.

A transistor 170 conducts so long as the regulator 70 is not drawing a current greater than a short circuit current. The power supply 160 typically provides power for four sensors simultaneously. So long as none of the four sensors draws greater than a certain amount of current, the transistor 170 conducts. If the current increases beyond a threshold limit the output voltage of the regulator 70 drops causing the voltage VCC to also drop. The drop in VCC causes the zener diode 172 to come out of its normal breakdown state, causing the transistor 170 to stop conducting and causing a supply monitor signal 174 to go high. The supply monitor signal 174 is monitored by the microprocessor 100 to determine a malfunction due to an excess current in one of the sensor circuits caused by a short circuit. As seen in Table I, a high monitor signal causes the microprocessor to invalidate all sensor output signals. In accordance with a preferred embodiment of the invention, the microprocessor 100 responds to a monitor signal by communicating this fact via a communications output channel.

The microprocessor 100 includes a power-on reset circuit 200 which causes a momentary reset of the microprocessor when power is first applied to the circuit.

In addition to the outputs for activating the light-emitting diodes 106,108, the microprocessor 100 includes a serial output circuit 210 and serial input circuit 220. These circuits 210,220 allow the microprocessor 100 to communicate the status of the sensors to a remotely located controller. The communications circuits 210, 220 include input/output filters 230 and conform to RS 485 specifications. The communications software executing in the microprocessor 100 implements a bi-directional handshaking protocol with error detection. The microprocessor outputs 102,104 are illustrated for activating the light-emitting diodes 106, 108 but in addition could be used as control outputs to supplement and/or replace the serial I/O circuits 210, 220.

As noted previously, a preferred embodiment of the invention is constructed using a microprocessor 100. A

TABLE I

| Sensor Type | Sensor Status | Output Monitor (44) | Type Detect (42) | Supply Monitor | Status Output (104) | Fault Output (102) |
|---|---|---|---|---|---|---|
| 2-Wire | OFF | >Vmid<Vhigh | <Vhigh | 0 | 1 | 1 |
| AC/DC | ON | >Vlow<Vmid | <Vhigh | 0 | 0 | 1 |
| 3-Wire Sinking | OFF | >Vlow<Vhigh | >Vhigh | 0 | 1 | 1 |
| 3-Wire Sinking | ON | <Vlow | >Vhigh | 0 | 0 | 1 |
| 3-Wire Sourcing | OFF | >Vlow<Vhigh | >Vhigh | 0 | 1 | 1 |
| 3-Wire Sourcing | ON | >Vhigh | >Vhigh | 0 | 0 | 1 |
| No Sensor | Open | >Vhigh | <Vhigh | 0 | 1 | 0 |
| Shorted Cable | Pin b–c Short | <Vlow | <Vhigh | 0 | 0 | 0 |
| Shorted Cable | Pin a–c Short | Undefined | Undefined | 1 | * | * |

Returning to FIG. 5, when the output 104 is low, an associated sensor is on and the LED 108 is activated. If the output 104 is high, an associated sensor is off and the LED 108 is off.

Auxiliary Circuits

Figure 3:
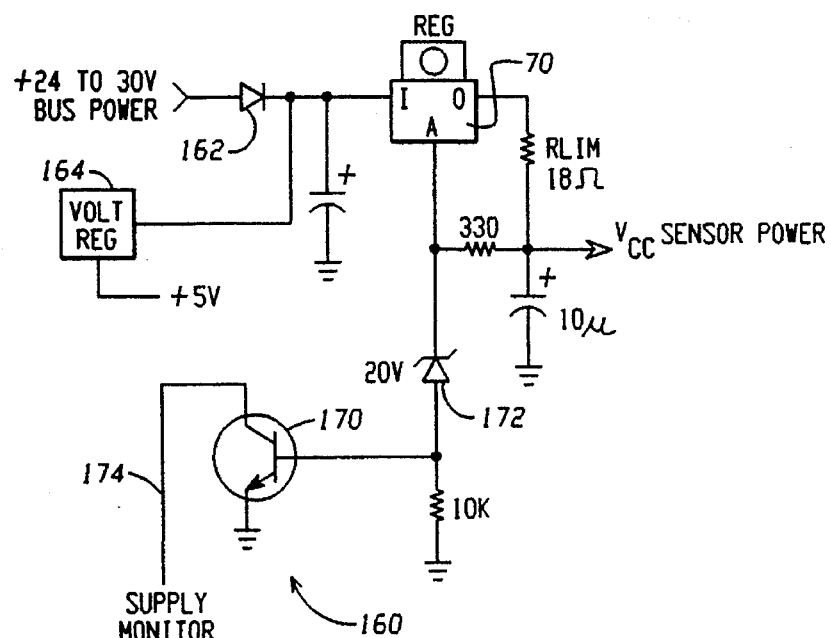
FIG. 3 is a power supply circuit for use with the present invention.

The microprocessor 100 requires a 5-volt input signal which is generated by a power supply circuit 160 (shown in FIG. 3). An input signal of approximately 24–30 volts passes through a diode 162 to a voltage regulator 164 which outputs the necessary 5-volt signal. The same input passes through the diode 162 to the regulator 70 for providing the VCC signal of 20 volts.

pseudo-code listing is presented for a control algorithm executing by the microprocessor 100 as input signals from the circuit 10 are monitored and evaluated.

```
START
CHECK POWER SUPPLY MONITOR
    NOT OK
        SET FAULT SIGNAL TO OUTPUTS
        RETURN TO START
    OK
        READ A/D INPUTS
        COMPARE 'SWITCH TYPE' VALUE TO V_MID
            HIGH (3 WIRE)
                TURN OFF FAULT SIGNAL
                COMPARE 'SWITCH STATUS' TO V_HI
                    HIGH (SOURCING ON)
                        TURN ON STATUS SIGNAL
                        RETURN TO START
                    LOW
                        COMPARE 'SWITCH STATUS' TO V_LO
                            LOW (SINKING ON)
                                TURN ON STATUS SIGNAL
                                RETURN TO START
                            HIGH (SENSOR OFF)
                                TURN OFF STATUS SIGNAL
                                RETURN TO START .
            LOW (2 WIRE)
                COMPARE 'SWITCH STATUS' TO V_MID
                    LOW (ON OR SHORT)
                        TURN ON STATUS SIGNAL
                        COMPARE 'SWITCH STATUS' TO V_LO
                            HIGH (NORMAL ON STATE VOLTAGE)
                                TURN OFF FAULT SIGNAL
                                RETURN TO START
                            LOW (SHORTED)
                                TURN ON FAULT SIGNAL
                                RETURN TO START
                    HIGH (OFF OR OPEN)
                        TURN OFF STATUS SIGNAL
                        COMPARE 'SWITCH STATUS' TO V_HI
                            LOW (NORMAL OFF STATE VOLTAGE)
                                TURN OFF FAULT SIGNAL
                                RETURN TO START
                            HIGH (OPEN)
                                TURN ON FAULT SIGNAL
                                RETURN TO START
```

The disclosed circuitry has been described with a degree of particularity. Although a microprocessor-based system is preferred, the hard wire logic system 110 depicted in FIG. 4 illustrates an alternate embodiment for use in certain applications. It is the intent that the invention include all modifications and alterations from the disclosed design falling within the spirit or scope of the appended claims.

We claim:

1. Sensor interface apparatus that can be coupled to a cable for conducting signals to a sensor comprising:
   a) an electrical connector having three conductive contacts for mating with either a two-wire or three-wire cable connected to a sensor;
   b) an interface circuit including a power conductor coupled to a first of the three conductive contacts of the connector; said interface circuit including: i) a current sensing circuit coupled to said first of the said three conductive contacts for sensing current flowing through said first contact to distinguish between a three-wire and two-wire cable connected to the sensor; ii) a sensor status monitoring circuit connected to another of said three contacts for monitoring a status of said sensor and iii) an output circuit for providing one output signal related to a type of sensor and a second output signal related to a status of the sensor as determined by the current sensing and status monitoring circuits.

2. The sensor interface apparatus of claim 1 additionally comprising a programmable controller for monitoring the status of the sensor including inputs for monitoring said first and second output signals from the output circuit to determine a status of the sensor.

3. The sensor interface apparatus of claim 1 wherein the output signals from the current sensing and the status monitoring circuits in combination indicate a fault condition and a type of fault.

4. The sensor interface circuit of claim 1 wherein the current sensing circuit comprises a switching transistor having a control electrode that causes the switching transistor to turn on and off in response to current flowing through the one contact.

5. A sensor interface circuit for monitoring a status of one or more sensors comprising:
   a) a connector for each of said one or more sensors having three conductive contacts for mating with either a two-wire or three-wire cable connected to an associated sensor;
   b) a sensing circuit for each sensor having an input coupled to a first of the said three conductive contacts that determines what type of sensor is connected to the connector based upon current passing through the first contact and provides a first output signal corresponding to the sensor type; and c) a monitor circuit having an input for each sensor coupled to at least one additional of said three conductive contacts that monitors a signal at said one additional conductive contacts to determine a status of an attached sensor and provides a second output signal corresponding to a sensor status.

6. The sensor interface circuit of claim 5 additionally comprising a programmable controller for monitoring the status of the first and second output signals, and for indicating a status of the one or more sensors.

7. The sensor interface of claim 6 additionally comprising an output circuit coupled to the programmable controller for communicating a status of the one or more sensors to a separate location and for providing a visual indication of the status of the one or more sensors.

* * * * *